United States Patent
Sebastian et al.

(10) Patent No.: US 11,121,956 B1
(45) Date of Patent: Sep. 14, 2021

(54) METHODS AND SYSTEMS FOR OPTIMIZING BIDIRECTIONAL FORWARDING DETECTION IN HARDWARE

(71) Applicant: Arista Networks, Inc., Santa Clara, CA (US)

(72) Inventors: Deepak Sebastian, San Francisco, CA (US); Aaron Gregory Levitan, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/881,748

(22) Filed: May 22, 2020

(51) Int. Cl.
*H04L 12/26* (2006.01)

(52) U.S. Cl.
CPC .............. *H04L 43/12* (2013.01); *H04L 43/04* (2013.01); *H04L 43/14* (2013.01)

(58) Field of Classification Search
CPC .......... H04L 43/12; H04L 43/04; H04L 43/14
See application file for complete search history.

(56) References Cited

U.S. PATENT DOCUMENTS

| | | | | |
|---|---|---|---|---|
| 7,561,527 B1* | 7/2009 | Katz | ....................... | H04L 43/50 370/241 |
| 2016/0226967 A1* | 8/2016 | Zhang | .................. | H04L 12/4654 |
| 2017/0222916 A1* | 8/2017 | Surender | ............. | H04L 41/0663 |
| 2018/0102951 A1* | 4/2018 | Wu | ...................... | H04L 43/0811 |
| 2019/0342200 A1* | 11/2019 | Juneja | ................... | H04L 67/147 |
| 2020/0059421 A1* | 2/2020 | Wang | .................. | H04L 41/0677 |
| 2020/0389390 A1* | 12/2020 | Vasseur | ................. | H04L 45/302 |
| 2021/0029083 A1* | 1/2021 | Li | ........................ | H04L 63/0272 |
| 2021/0126848 A1* | 4/2021 | Wang | .................. | H04L 12/4633 |

OTHER PUBLICATIONS

Arista EOS Control, "Tag:EOS-4.23.0F—Hardware Accelerated BFD Transmit" (Year: 2019).*
Katz & Ward; "Bidirectional Forwarding Detection (BFD) for IPv4 and IPv6 (Single Hop)"; IETF, RFC 5881; DOI: 10.17487/RFC5881; Jun. 2010 (https://tools.ietf.org/html/rfc5881).
Katz & Ward; "Bidirectional Forwarding Detection (BFD)"; IETF, RFC 5880; DOI: 10.17487/RFC5880; Jun. 2010 (https://tools.ietf.org/html/rfc5880).
Lindsay & Foerster; "RTP Payload Format for Standard apt-X and Enhanced apt-X Codecs"; IETF, RFC 7310; DOI: 10.17487/RFC7310; Jul. 2014 (https://tools.ietf.org/html/rfc7310).

* cited by examiner

*Primary Examiner* — Jerry B Dennison
(74) *Attorney, Agent, or Firm* — Chamberlain, Hrdlicka, White, Williams & Aughtry (57) ABSTRACT

A method performed by a network device for offloading bidirectional forwarding detection (BFD) processes from an operating system of the network device to a physical communication interface on the network device, that includes receiving, by a user space packet manager executing in the operating system, a BFD transmission session request, making a first determination that utilization of an interface processor, of the physical communication interface, is below a threshold, generating, based on the first determination, a transmission packet template, wherein the generation is performed by the user space packet manager, sending, by the user space packet manager, the transmission packet template to the physical communication interface, and initiating, after the sending, a BFD transmission session in the physical communication interface, wherein the initiating is performed by the user space packet manager.

20 Claims, 6 Drawing Sheets

METHODS AND SYSTEMS FOR OPTIMIZING BIDIRECTIONAL FORWARDING DETECTION IN HARDWARE

BACKGROUND

Network device resource utilization may surpass desirable thresholds and bottleneck certain processes when operating system software of the network device is tasked with performing burdensome operations. In such scenarios, it may be desirable to adapt one or more existing hardware devices to enhance the functionalities of network device components and optimize the overall utilization of resources, thereby reducing the burden on the operating system software.

SUMMARY

In general, in one aspect, embodiments relate to a method performed by a network device for offloading bidirectional forwarding detection (BFD) processes from an operating system of the network device to a physical communication interface on the network device, that includes receiving, by a user space packet manager executing in the operating system, a BFD transmission session request, where the BFD transmission session request is associated with the physical communication interface; making a first determination that utilization of an interface processor, of the physical communication interface, is below a threshold; generating, based on the first determination, a transmission packet template, where the generation is performed by the user space packet manager; sending, by the user space packet manager, the transmission packet template to the physical communication interface; and initiating, after the sending, a BFD transmission session in the physical communication interface, where the initiating is performed by the user space packet manager.

In general, in one aspect, embodiments relate to a network device, that includes a communication interface, that includes an interface processor; interface cache; and an interface buffer; system memory; and a system processor executing a user space packet manager, where the user space packet manager performs a method for offloading bidirectional forwarding detection (BFD) processes to the communication interface, that includes receiving a BFD transmission session request, where the BFD transmission session request is associated with the communication interface; making a first determination that utilization of the interface processor, of the communication interface, is below a threshold; generating, based on the first determination, a transmission packet template; sending the transmission packet template to the communication interface; and initiating a BFD transmission session in the communication interface.

In general, in one aspect, embodiments relate to a method for offloading bidirectional forwarding detection (BFD) processes to a communication interface, that includes receiving, by a user space packet manager, a BFD transmission session request, where the BFD transmission session request is associated with the communication interface; making a first determination that utilization of an interface processor, of the communication interface, is below a threshold; generating, based on the first determination, a transmission packet template, where generating the transmission packet template includes storing the transmission packet template in a system buffer associated with communication interface by directly writing to system memory; sending the transmission packet template to the communication interface; and initiating a BFD transmission session in the communication interface.

Other aspects will be apparent from the following description and the appended claims.

DETAILED DESCRIPTION

In one or more embodiments, a network device may monitor the status of one or more of network connections by utilizing Bidirectional Forwarding Detection (BFD) software executing in user space (i.e., "user space packet manager"). BFD software operates by frequently initiating the creation and transmission of packets (e.g., every 50-200 ms) over a network connection to determine whether that network connection is active (e.g., currently operatively connected to another network device). Prior to the disclosed embodiments, each transmission packet is individually generated by additional software executing in the operating system (e.g., "kernel packet manager") before being sent to a communication interface (e.g., network port) for subsequent transmission. However, (i) the number of transmission packets, and (ii) the frequency at which those transmission packets are sent is limited by the capabilities of the network device's system processor executing the kernel packet manager (in the operating system).

To bypass these resource limitations, one embodiment disclosed herein provides that the user space BFD software (i.e., "user space packet manager") send a "transmission packet template" to the processing hardware of a communication interface (e.g., a network port, or an application specific integrated circuit (ASIC) and/or advanced reduced instruction set computer (RISC) machine (ARM) core thereof). Thus, the communication interface may generate and send transmission packets independently—without the use of operating system software (i.e., "the kernel packet manager"). Accordingly, the generation of transmission packets may be offloaded from the processor executing the kernel packet manager and distributed among the interface processor(s) of one or more communication interface(s). Further, in one embodiment, user space BFD software may be configured to directly manipulate regions of physical memory of the network device—completely bypassing operating system software interaction altogether—thereby further reducing utilization of the network device's system processor and optimizing efficiency of the limited system resources.

However, the processing resources of a communication interface are also limited. Accordingly, in one embodiment, the user space BFD software is configured to independently track the utilization of interface processors to determine if an upper utilization threshold of the processing hardware of the communications interface is surpassed. For example, if the BFD software determines that the processing hardware of a communication interface is executing a maximum number of active sessions (e.g., 200), the BFD software may then direct all new sessions to use the kernel packet manager executing in the operating system to generate the additional transmission packets. Thus, in one embodiment, a "hybrid system" may be employed where the user space BFD software is configured to: (1) first maximize utilization of the communication interface processing hardware before, (2) directing all new/additional BFD transmission sessions to utilize the kernel packet manager executing in the operating system and consuming the processing resources of the network device.

Further, offloading the generation of transmission packets from a kernel packet manager to processing hardware of a communication interface does not affect existing methods for receiving and analyzing those transmission packets. As a non-limiting example, the kernel packet manager (of the receiving network device) analyzes the transmission packet using the same method regardless of the manner in which the transmission packets are generated (i.e., by kernel module or an interface processor). Accordingly, the network device may continue to utilize the existing kernel packet manager for processing the received packets.

Figure 1:
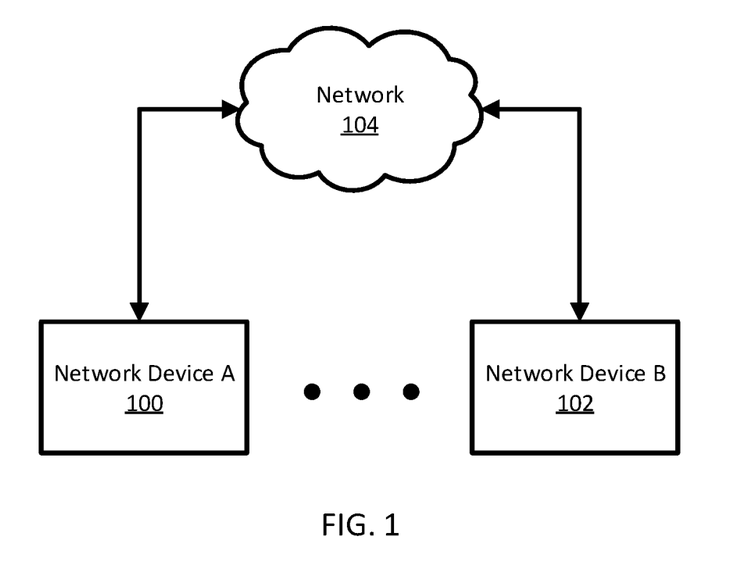
FIG. 1 shows a diagram of a system, in accordance with one or more embodiments.

FIG. 1 shows a diagram of a system, in accordance with one or more embodiments. In one or more embodiments, a system many include one or more network devices (e.g., network device A (100), network device B (102), etc.) that are operatively connected via a network (e.g., network (104)). Each of these components is described below.

In one or more embodiments, a network device (e.g., network device A (100), network device B (102), etc.) is a physical device that includes hardware with, at least, one or more communication interface(s), storage and/or memory, and a processor. Non-limiting examples of a network device include, but are not limited to, a network switch, a router, a multilayer switch, a fibre channel device, an InfiniBand® device, etc. More details regarding network devices (e.g., network device A (100), network device B (102), etc.) are discussed in the description of FIG. 2.

In one or more embodiments, a network (e.g., network (104)) is a collection of connected network devices (e.g., 100, 102) that allow for the communication of data from one network device (e.g., 100) to other, external network devices (e.g., 102), or the sharing of resources among network devices (e.g., 100, 102). Examples of a network (e.g., network (104)) include, but are not limited to, a local area network (LAN), a wide area network (WAN) (e.g., the Internet), a mobile network, or any other type of network that allows for the communication of data and sharing of resources among network devices and/or devices operatively connected to the network (e.g., network (104)). One of ordinary skill in the art, having the benefit of this detailed description, would appreciate that a network (e.g., network (104)) is collection of operatively connected devices that enables communication between those devices.

While FIG. 1 shows a system according to one or more embodiments, other configurations may be used without departing from the scope. Accordingly, embodiments disclosed herein should not be limited to the configuration of devices and/or components shown in FIG. 1.

Figure 2:
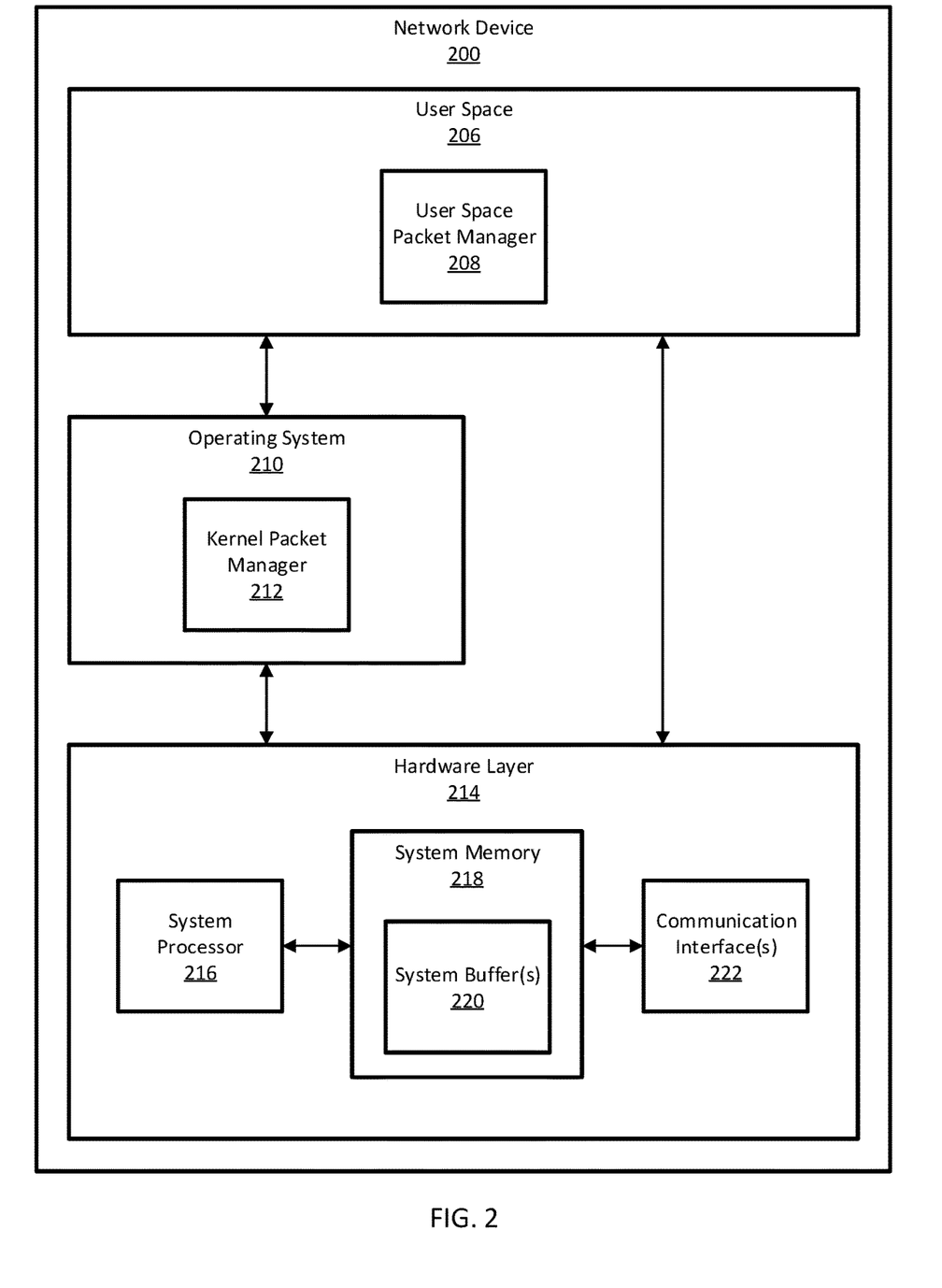
FIG. 2 shows a diagram of a network device, in accordance with one or more embodiments.

FIG. 2 shows a diagram of a network device, in accordance with one or more embodiments. In one or more embodiments, a network device (e.g., network device (200)) includes a user space (e.g., user space (206)), an operating system (e.g., operating system (210)), and a hardware layer (e.g., hardware layer (214)). Each of these components is described below.

In one or more embodiments, a user space (e.g., user space (206)) is a software environment on network device (200) that generally provides a virtual space in which user initiated software executes (e.g., user space packet manager (208), other user program(s) and/or application(s), etc.). In one or more embodiments, user space (206) is allocated a segregated memory environment of system memory (218) (apart from memory used by operating system (210)) and may be able to leverage more of the underlying resources of the network device (200) to perform processes. In one embodiment, user space (206) software (e.g., 208) does not have direct access to underlying hardware components (i.e., those of hardware layer (214)), but instead must provide commands and/or requests to the operating system (210) which, in turn, coordinates the exchange of information between user space software (e.g., 208) and hardware layer (214) components (e.g., 216, 220, 222). Alternatively, in one or more embodiments, user space (206) and software executing thereon (e.g., user space packet manager (208)) may be able to establish direct access to one or more components of hardware layer (214) and utilize and/or manipulate hardware layer components (e.g., 216, 220, 222) without interacting with operating system (210). As a non-limiting example, user space packet manager (208) may be able to establish direct access to a region of system memory (218) utilizing operating system (210); and then, once established, user space packet manager (208) may be able to manipulate (read and/or write) data on that region of memory without any further interaction with operating system (210).

In one or more embodiments, a user space packet manager (e.g., user space packet manager (208)) is software executing in user space (206) of the network device (200) that receives requests to start a BFD transmission session, coordinate the initiation of BFD transmission sessions, and generate transmission packet templates for suitable components of network device (200) (i.e., kernel packet manager (212) and/or one or more communication interface(s) (222)). A user space packet manager (e.g., user space packet manager (208)) may perform some or all of the method shown in FIGS. 4-5.

In one or more embodiments, an operating system (e.g., operating system (210)) is software executing on network device (200) that generally provides a virtual space in which system initiated and/or kernel software executes. In one embodiment, operating system (210) coordinates operations between user space (206) software (e.g., 208) and one or more hardware layer (214) components (e.g., 216, 218, 222) to facilitate the proper use of those hardware layer components (e.g., 216, 218, 222). In one or more embodiments, the operating system (210) includes a kernel packet manager (e.g., kernel packet manager (212)) and/or other operating system software (not shown) executing therein.

In one or more embodiments, kernel packet manager (e.g., kernel packet manager (212)) is software executing in operating system (210). Kernel packet manager (212) is configured to perform traditional methods of BFD transmission packet generation performed in an operating system (e.g., operating system (210)). In one or more embodiments, kernel packet manager (212) receives data (e.g., a transmission packet template) and commands from the user space packet manager (208) to initiate performing a BFD transmission session. More details regarding the processes performed the kernel packet manager (212) may be found in the description of FIG. 5.

In one or more embodiments, hardware layer (e.g., hardware layer (214)) is a collection of physical components configured to perform the operations of the network device (200) and/or otherwise execute the software of the network device (200) (e.g., user space (206), user space packet manager (208), operating system (210), kernel packet manager (212)). In one or more embodiments, hardware layer (214) includes system processor (216), system memory (218), and one or more communication interface(s) (222).

In one or more embodiments, system processor (e.g., system processor (216)) is an integrated circuit for processing instructions (e.g., those of user space (206) software (e.g., user space packet manager (208)) and/or operating system (210) software (e.g., kernel packet manager (212)) and/or those received via one or more communication interface(s) (222)). In one embodiment, a processor (e.g., system processor (216)) may be one or more processor cores or processor micro-cores.

In one or more embodiments, system memory (e.g., system memory (218), or "memory" generally) is one or more hardware devices capable of storing digital information (e.g., data) in a non-transitory medium. In one or more embodiments, when accessing system memory (218), other components of network device (200) are capable of reading and writing data at the smallest units of data normally accessible (e.g., "bytes"). Specifically, in one or more embodiments, system memory (218) may include a unique physical address for each byte stored thereon, thereby enabling software to access and manipulate data stored in system memory (218) by directing commands to a physical address of system memory (218) that is associated with a byte of data (e.g., via a virtual-to-physical address mapping). Accordingly, in one or more embodiments, software is able to perform direct, "byte-level" manipulation of data stored in system memory (unlike, for example, data located stored on traditional persistent storage devices, which must first be copied in "blocks" to other, intermediary storage mediums prior to reading and/or manipulating data located thereon).

Accordingly, as used herein, "system memory", "memory", "memory device", "memory storage", and "memory storage device" refer to hardware storage devices that are capable of being accessed and/or manipulated at a "byte-level" regardless of whether that device is volatile, non-volatile, persistent, non-persistent, sequential access, random access, solid-state, or disk based.

Non-limiting examples of memory devices include, but are not limited to, certain integrated circuit storage (e.g., flash memory, random access memory (RAM), dynamic RAM (DRAM), static RAM (SRAM), resistive RAM (Re-RAM), etc.). Further, hybrid devices that include two or more forms of storage (e.g., a non-volatile dual in-line memory module (NVDIMM)) may be considered "memory" if the hybrid device component that interacts with network device (200) is capable of being accessed and/or manipulated at a "byte-level". For example, a "persistent memory" (PMem) module that includes, for example, a combination of DRAM, flash memory, and a capacitor (for persisting DRAM data to flash memory in the event of power loss) is considered "memory" as the DRAM component (the component of the module accessible by the memory management unit) is capable of being accessed and/or manipulated at a "byte-level".

In one or more embodiments, a system buffer (e.g., system buffer(s) (220)) is a region of system memory (218) that temporarily stores data before a copy of that data is persisted on another storage device, and the data stored in system buffer (220) is overwritten. In one or more embodiments, system buffer(s) (220) are used by the user space packet manager to store one or more transmission packet template(s) before being sent to a communication interface.

In one or more embodiments, the outer boundaries of a system buffer (e.g., 220) (i.e., the associated virtual and/or physical addresses of the system memory region) do not constrain the ability to write new data to that system buffer. Rather, in one embodiment, if the physical "end" of a system buffer (e.g., 220) is reached, new data is written to the "beginning" of that system buffer as if the system buffer continues, in a loop, without physical interruption or size limitation. Thus, in one embodiment, system buffer(s) (220) may be considered "circular" because the newest data written to a system buffer is copied adjacent to the previous data (or to the beginning of the range), regardless of the physical limitations of the associated range and the data that may already exist in those locations.

In one or more embodiments, a communication interface (e.g., communication interface(s) (222)) is a hardware component that provides capabilities to interface the network device (200) with one or more other network devices (not shown) and allow for the transmission and receipt of data with those other network devices. Communication interface(s) (222) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access (RDMA), Institute of Electrical and Electronics Engineers (IEEE) 801.11, etc.). More details regarding communication interfaces (e.g., communication interface(s) (222)) are discussed in the description of FIG. 3.

While FIG. 2 shows a network device according to one or more embodiments, other configurations may be used without departing from the scope. Accordingly, embodiments disclosed herein should not be limited to the configuration of devices and/or components shown in FIG. 2.

Figure 3:
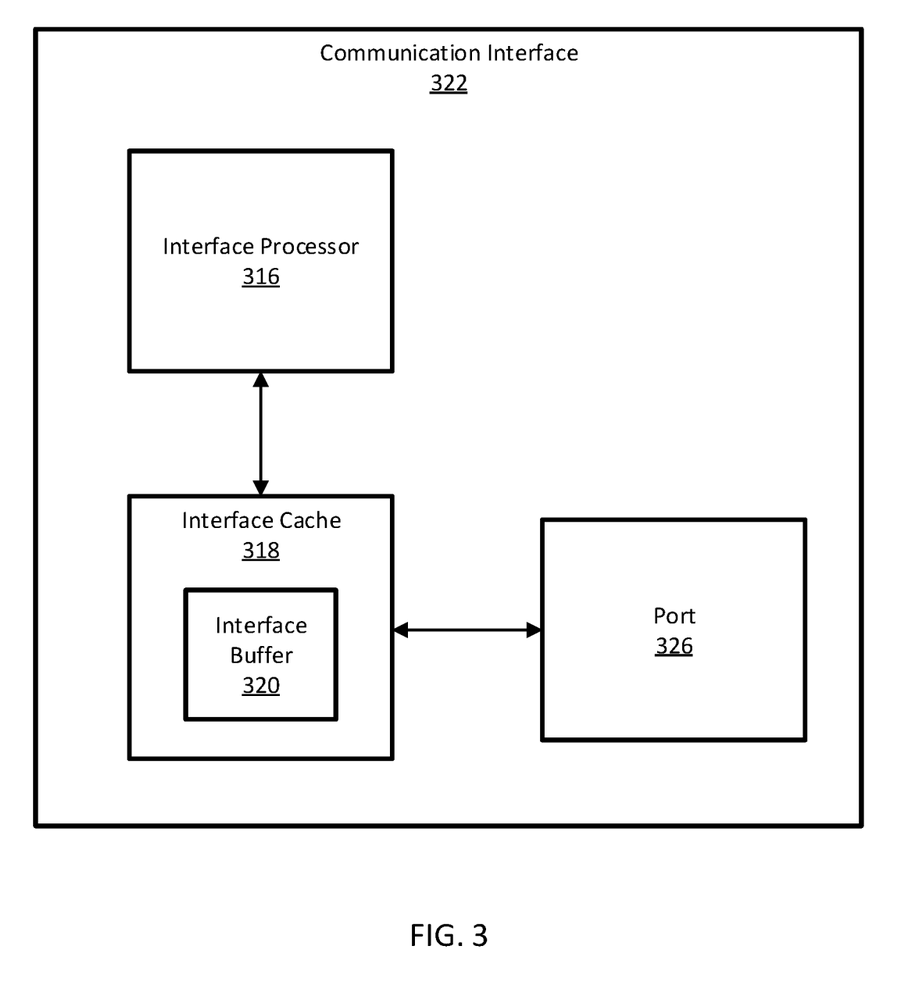
FIG. 3 shows a diagram of a communication interface, in accordance with one or more embodiments.

FIG. 3 shows a diagram of a communication interface, in accordance with one or more embodiments. In one or more embodiments, a communication interface (e.g., communication interface (322)) may include interface processor (316), interface cache (318), and port (326). Each of these components is described below.

In one or more embodiments, interface processor (e.g., interface processor (316)) is an integrated circuit for processing instructions (e.g., those stored and/or received by communication interface (322)). In one embodiment, a processor (e.g., interface processor (316)) may be one or more processor cores or processor micro-cores. Non-limiting examples of integrated circuits include ASICs, field programmable gate arrays (FPGAs), and/or other configurable circuitry.

In one or more embodiments, interface cache (e.g., interface cache (318)) is one or more hardware devices capable of storing digital information (e.g., data) in a non-transitory medium. In one or more embodiments, interface cache (318) is used by interface processor (316) to perform operations on data, as commanded by instructions processed by interface processor (316). In one or more embodiments, interface cache (318) is a limited resource (e.g., little total space) and may therefore reach its maximum capacity more quickly than other devices that store digital information. However, although limited in total capacity, interface cache (318) may provide less latency when used to perform operations (e.g., reading, writing) compared to other storage devices (e.g., system memory).

In one or more embodiments, an interface buffer (e.g., interface buffer (320)) is a region of interface cache (318) that, similar to system buffer(s) discussed in the description of FIG. 2, temporarily stores data before a copy of that data is persisted on another storage device. In one or more embodiments, interface buffer (320) is used by the communication interface to store one or more transmission packets prior to copies being generated and sent via port (326). In one embodiment, data may only be located in interface buffer (320) temporarily, prior to being transmitted via port (326).

Although interface cache (318) is shown as a separate component of communication interface (322), interface cache (318) and interface processor (316) may be physically integrated into a single integrated circuit (e.g., an ASIC with an ARM core). Further, in one or more embodiments, interface cache (318) may include and/or be operatively connected to one or more types of memory, as discussed in the description of FIG. 2. One of ordinary skill in the art, having the benefit of this detailed description, would appreciate that the interface cache (318) and interface processor (316) may be physically combined onto a single chip that provides the functionality of all components (shown separate in FIG. 3).

In one or more embodiments, a port (e.g., port (326)) is the physical connector housing that includes materials that enable interfacing with the terminal connections of a corresponding connector of a network link. Accordingly, in one or more embodiments, port (326) provides the physical interface through which operative connections are made with other network devices. Alternatively, in one or more embodiments, a port may be a physical antenna that enables wireless communication with other network devices.

While FIG. 3 shows a communication interface according to one or more embodiments, other configurations may be used without departing from the scope. Accordingly, embodiments disclosed herein should not be limited to the configuration of devices and/or components shown in FIG. 3.

Figure 4:
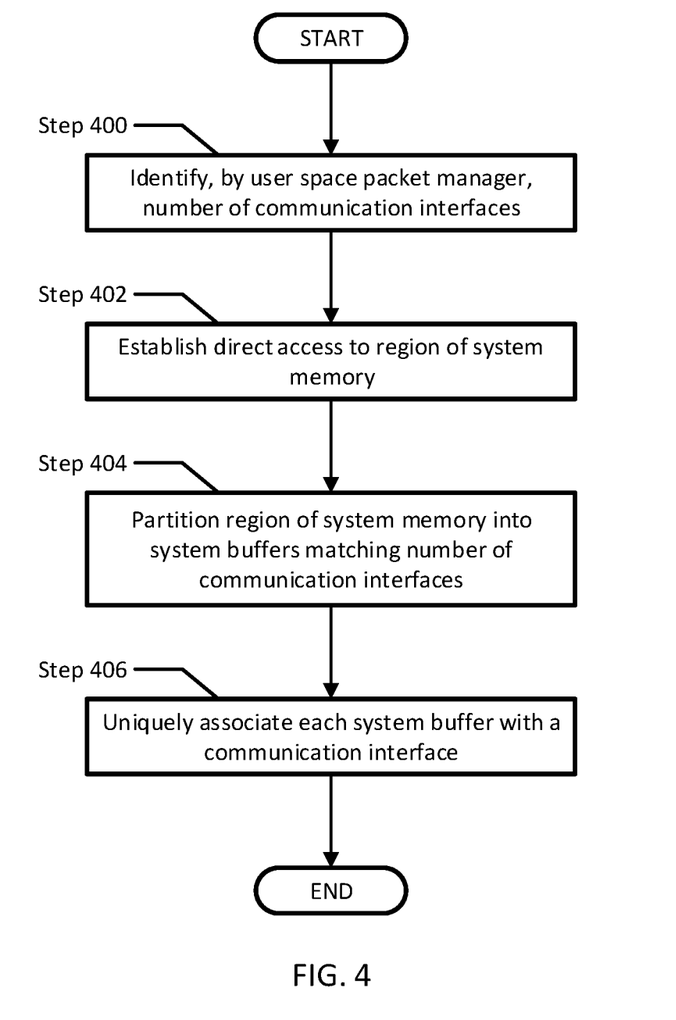
FIG. 4 shows a flowchart of a method of establishing access to and allocating system memory, in accordance with one or more embodiments.

FIG. 4 shows a flowchart of a method of establishing access to and allocating system memory, in accordance with one or more embodiments. All or a portion of the method shown in FIG. 4 may be performed by one or more components of the user space packet manager. However, another component of the system may perform this method without departing from this or other embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 400, a user space packet manager identifies the number of communication interfaces present in the network device. In one or more embodiments, the user space packet manager may read a list of known and/or attached devices from a file object maintained by the operating system, and identify from that list how many communication interfaces are present. Alternatively, in one or more embodiments, a user of the network devices may specify a number of communication interfaces that are included in the network device, and the user space packet manager may use that provided number.

In Step 402, the user space packet manager establishes direct access to a region of system memory. In one or more embodiments, a user space packet manager may establish direct access to a region of memory by initiating a mapping command (e.g., "mmap( )") and specifying a range of virtual memory addresses of the user space packet manager and a corresponding range of physical address of the system memory. In turn, that mapping command is passed to the operating system, system processor, and system memory. At the system memory, a translation table is updated to associate the virtual address range of the user space packet manager with the physical address range of the system memory specified in the mapping command. In one or more embodiments, once the direct memory mapping is established, the user space packet manager may directly access (e.g., read) and manipulate (e.g., write) that range of physical memory addresses without interacting with the operating system and/or operating system software—thereby expediting any user space processes involving system memory.

In Step 404, the user space packet manager partitions the region of system memory (for which direct access has been established in Step 402) into a number of system buffers that correspond to the number of communication interfaces of the network device (identified in Step 400). In one embodiment, the user space packet manager may virtually generate these system buffers by partitioning the range of virtual memory addresses into a number of sub-ranges that match the number of identified communication interfaces. Accordingly, the user space packet manager may manage the number of system buffers independent of other software instances (i.e., without establishing two or more direct access regions to system memory). Further, in one or more embodiments, the user space packet manager may establish two or more direct access mappings to system memory (corresponding to a number of communication interfaces), each of which is associated with a unique system buffer.

In Step 406, the user space packet manager uniquely associates each system buffer with a communication interface. In one or more embodiments, the user space packet manager may maintain (e.g., create, update, etc.) a data structure (e.g., table) that includes mappings between system buffers (associated with unique regions or sub-regions of virtual addresses) and communication interfaces.

Figure 5:
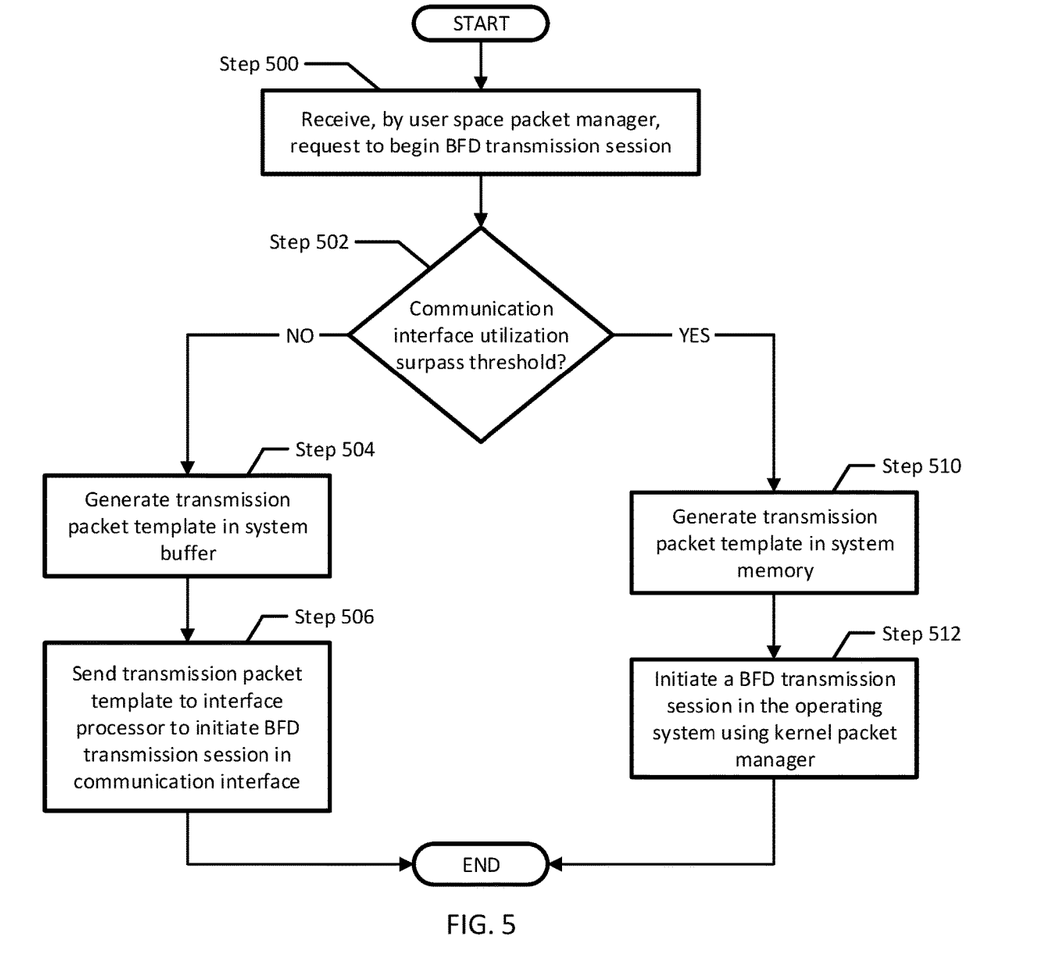
FIG. 5 shows a flowchart of a method of initiating a bidirectional forwarding detection session, in accordance with one or more embodiments.

FIG. 5 shows a flowchart of a method of initiating a bidirectional forwarding detection session, in accordance with one or more embodiments. All or a portion of the method shown in FIG. 5 may be performed by one or more components of the user space packet manager. However, another component of the system may perform this method without departing from this or other embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a user space packet manager receives a request to begin a BFD transmission session. In one or more embodiments, the request to begin a BFD transmission session may be generated and sent by another process executing on the network device (e.g., an operating system application, other user space software, etc.), or the request may be manually generated by a user of the network device. In one or more embodiments, the request to begin a BFD transmission session may include an identifier that specifies a communication interface (e.g., a port number), an IP address of an external network device (operatively connected to a communication interface), and/or other data that uniquely identifies one communication interface of the network device. Further, in one or more embodiments, the request to begin a BFD transmission session may specify the rate at which transmission packets are to be sent during the BFD transmission session (i.e., "frequency", "time interval", "time threshold").

In one or more embodiments, a request to start a new BFD transmission session may be generated due to a change in properties of one or more of the components of the system. As a non-limiting example, if the network device is given a new IP address, all existing BFD transmission session would have to be stopped and replaced with new BFD transmission sessions specifying the updated source IP address. Other non-limiting examples of what may cause the generation of a request to begin a BFD transmission session may include change in destination IP address, Quality of Service (QoS) change, authentication change, and/or change in the frequency at which transmission packets are sent. In one embodiment, a change in frequency of transmission packets may be implemented without stopping the BFD transmission session, but may instead, the existing BFD transmission session may be updated to use the newly specified frequency.

In Step 502, the user space packet manager makes a determination if the hardware resources of the communication interface (e.g., the interface processor) specified by the request (received in Step 500) surpass a utilization threshold. In one or more embodiments, the user space packet manager may indirectly measure communication interface resource utilization by monitoring (i.e., keeping track of) the number of BFD transmission sessions executing on the communication interface. Additionally, the user space packet manager may further monitor the frequency at which transmission packets are transmitted for each BFD transmission session, thereby allowing the user space packet manager to calculate the number of transmission packets being generated and sent per a unit of time. As another method, the user space packet manager may be able to read utilization of the interface processor directly from the communication interface via data maintained by the communication interface regarding resource utilization.

In one or more embodiments, the user space packet manager may additionally analyze the type of network connection for the requested BFD transmission session in order to determine compatibility for offloading transmission packet generation to a communication interface. As a non-limiting example, the user space packet manager may identify that the requested BFD transmission session is for a network connection that is utilizing two or more communication interfaces in a link aggregation group (LAG). Accordingly, in such an instance, the user space packet manager may be configured to determine that the BFD transmission session is to be performed by the kernel packet manager and not by a communication interface (or two or more communication interfaces, as the case may be).

Further, in one or more embodiments, the user space packet manager may first determine that the type of network connection may not be suitable for offloading to a communication interface (e.g., as the network connection is utilizing a LAG). Accordingly, in such an instance, the user space packet manager may bypass the step of determining communication interface utilization (as BFD transmission session may be performed by the kernel packet manager regardless of communication interface utilization).

In one or more embodiments, the user space packet manager may perform a comparative analysis of two or more BFD transmission session requests in order to prioritize which BFD transmission session should consume the resources of that communication interface. As a non-limiting example, the user space packet manager may identify the BFD transmission session request with the highest transmission frequency and prioritize that BFD transmission session (e.g., generate some order and/ranking metadata associated with the BFD transmission session request). Additionally, in one or more embodiments, other criteria may be used to calculate a priority ranking, for example: the operatively connected network device, user input, and/or any other relevant data.

Additionally, in one or more embodiments, the user space packet manager may move an existing BFD transmission session, executing in a communication interface, to the kernel packet manager in order to free up communication interface resources for a higher priority BFD transmission session. As a non-limiting example, the user space packet manager may receive a request to initiate a new BFD transmission session with a comparatively high transmission frequency. In turn, the user space packet manager may determine that the communication interface utilization exceeds a utilization threshold. However, instead of initiating the new, higher-priority BFD transmission session via the kernel packet manager, the user space packet manager may perform a comparative prioritization analysis of each FBD transmission session executing in the communication interface. And, in turn, if the user space packet manager identifies a BFD transmission session executing in the communication interface with a lower prioritization rank, the user space packet manager may end that lower-priority BFD transmission session and re-initiate that lower-priority BFD transmission session utilizing the kernel packet manager.

Accordingly, per the non-limiting example, as communication interface resources are freed when the lower-priority BFD transmission session is ended, the user space packet manager may initiate the higher-priority BFD transmission session utilizing the communication interface hardware. In one or more embodiments, the user space packet manager may further identify one or more existing BFD transmission session(s) that, based on their respective utilization, when stopped would free up sufficient communication interface resources to allow the new BFD transmission session to execute in the communication interface.

If it is determined that the communication interface utilization surpasses a utilization threshold (502—YES), the process proceeds to Step 510. Alternatively, if it is determined that the communication interface utilization does not surpass a utilization threshold (502—NO), the process proceeds to Step 504.

In Step 504, the user space packet manager generates a transmission packet template in an associated system buffer. In one or more embodiments, the transmission packet template may include the frequency (e.g., time interval) at which transmission packets are to be sent by the communication interface, a BFD transmission session identifier, a Quality of Service (QoS) metric, a source IP address (of the network device from which the transmission packet is being sent), a destination IP address (of the network device to which the transmission packet is being received), authentication information (credentials, hash, etc.), and/or other data relevant or necessary to processing BFD transmission packets.

In Step 506, the user space packet manager sends the transmission packet template to the interface processor. In one or more embodiments, the user space packet manager sends the transmission packet template to the interface processor by initiating copying of the transmission packet template from the system buffer to the communication interface associated with that system buffer. In one or more embodiments, by copying the transmission packet template to the communication interface also acts as a command to initiate the BFD transmission session on the communication interface. Alternatively, in one embodiment, the user space packet manager may additionally send an additional command to initiate the BFD transmission session after the transmission packet template is sent to the communication interface.

In Step 510, the user space packet manager generates a transmission packet template in system memory. In one or more embodiments, as discussed in the description of Step 504, the transmission packet template may include the frequency (e.g., time interval) at which transmission packets are to be sent by the communication interface, a BFD transmission session identifier, a Quality of Service (QoS) metric, a source IP address (of the network device from which the transmission packet is being sent), a destination IP address (of the network device to which the transmission packet is being received), authentication information (credentials, hash, etc.), and/or other data relevant or necessary to processing BFD transmission packets.

In one or more embodiments, the user space packet manager may provide a transmission packet template to the kernel packet manager that does not include some of the data provided in a transmission packet template generated for a communication interface (as described in the discussion of Step 504). As a non-limiting example, a transmission packet template generated for a kernel packet manager may not need to specify the source IP address (as the kernel packet manager may be able to dynamically add that information upon generation of the transmission packet).

In Step 512, the user space packet manager initiates the BFD transmission session using the kernel packet manager executing in the operating system. In one or more embodiments, in response to receiving a BFD transmission session initiation request, the kernel packet manager (executing on the system processor) may begin generating transmission packets. Specifically, the kernel packet manager may (i) copy the transmission packet template (generated in Step 510) in system memory to obtain a transmission packet, (ii) update and/or modify the transmission packet with additional information that may be absent (e.g., source IP address, timestamp, QoS), and (iii) initiate sending that updated transmission packet (generated in system memory) via a communication interface associated with the BFD transmission session. Accordingly, in one or more embodiments, when the kernel packet manager is used to generate transmission packets, the system processor and the system memory of the network device are utilized to perform the BFD transmission session processes.

In one or more embodiments, the BFD transmission session initiated by the user space packet manager and executed by the kernel packet manager may be the same BFD transmission packet generation process performed when not utilizing the communication interface hardware for transmission packet generation (i.e., without offloading BFD transmission session to communication interfaces). One of ordinary skill in the art, having the benefit of this detailed description would appreciate that traditional forms of BFD transmission packet generation may be used by the kernel packet manager to complete the process of Step 512.

Figure 6:
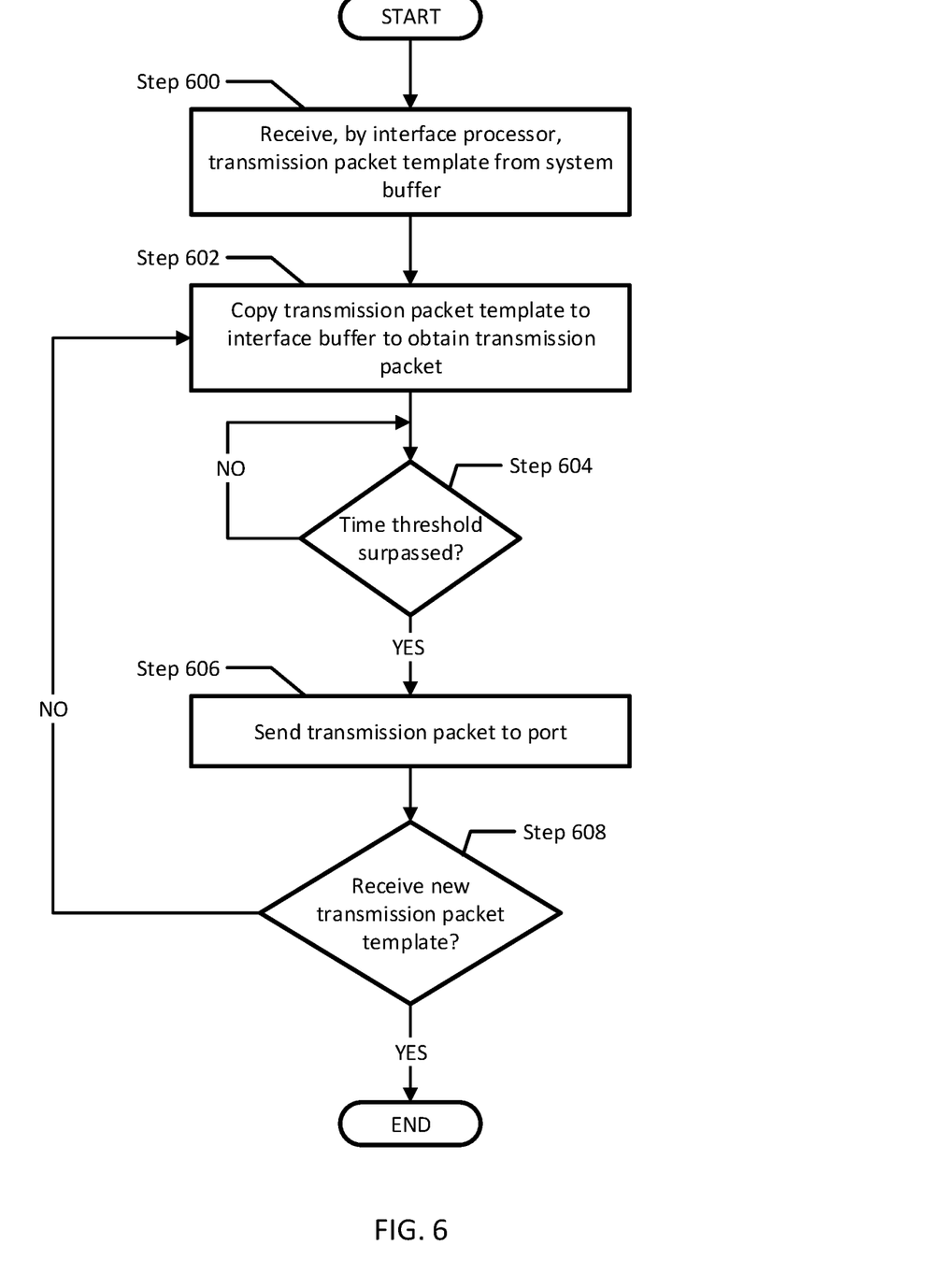
FIG. 6 shows a flowchart of a method of performing bidirectional forwarding detection utilizing hardware, in accordance with one or more embodiments.

FIG. 6 shows a flowchart of a method of performing bidirectional forwarding detection utilizing hardware, in accordance with one or more embodiments. All or a portion of the method shown in FIG. 6 may be performed by one or more components of the interface processor. However, another component of the system may perform this method without departing from this or other embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 600, an interface processor of the communication interface receives a transmission packet template from an associated system buffer. In one or more embodiments, the transmission packet template is stored in the interface cache of the communication interface upon receipt from the system buffer. In one or more embodiments, the interface processor is configured to initiate the generation and transmission of transmission packets based on the receipt of a transmission packet template. Alternatively, the interface processor may be configured to await additional instructions (i.e., request and/or commands) from the user space packet manager before initiating the generation of any transmission packets.

In Step 602, the interface processor copies the transmission packet template to the interface buffer of the communication interface. In one or more embodiments, the transmission packet (obtained by copying the transmission packet template) may be in a form and include all relevant data to be sent out the port of the communication interface. Alternatively, in one or more embodiments, the interface processor may input additional data (e.g., timestamp, unique identifier, etc.) into the transmission packet prior to sending the packet to another network device.

In Step 604, the interface processor makes a determination if the time threshold (i.e., the frequency at which transmission packet are sent) has been surpassed. In one or more embodiments, transmission packets are sent at regular intervals from the communication interface, and accordingly the interface processor may use a clock to determine when to send each transmission packet based on a time elapsed since the most previous transmission packet was sent (or since the BFD transmission session was initiated). Additionally, in one or more embodiments, the interface processor may use a known time on the clock for each transmission (e.g., for a transmission frequency of one second, the user space packet manager may initiate sending the transmission packet every time the clock indicates a second change).

If it is determined that the time threshold has been surpassed (604—YES), the process proceeds to Step 606. Alternatively, if it is determined that the time threshold has not been surpassed (604—NO), the process is paused (or otherwise is delayed) until the time threshold condition is satisfied.

In Step 606, the interface processor sends the transmission packet to the port of the communication interface. In one or more embodiments, sending the transmission packet to the port includes copying the transmission packet from the interface buffer and sending the copied data to the port in a format satisfying the protocol used by the communication interface.

In one or more embodiments, upon sending the transmission packet to the port, the interface processor may update a set of statistics regarding the current BFD transmission session. In one or more embodiments, the interface processor may track the number of transmission packets sent during the current session, error counts, interface processor utilization, and/or other metrics that may be collected during a BFD transmission session.

In Step 608, the interface processor makes a determination whether a new (e.g., updated) transmission packet template has been received. In one or more embodiments, a BFD transmission session may be terminated when the interface processor receives a new transmission packet template that supplants the existing transmission packet template.

Alternatively, in one or more embodiments, the interface processor may receive instructions (e.g., a request and/or command) to terminate the current BFD transmission session. In such a case, the interface processor ceases performing the process of FIG. 6 similar to an instance where a new transmission packet template is received (608—YES).

If it a new transmission packet template is not received (608—NO), the process returns to Step 602. Alternatively, if a new transmission packet template is received by the interface processor (608—YES), the process may end.

In one or more embodiments, the interface processor may receive an update to change the frequency at which transmission packets are sent. In one embodiment, where the only change to the BFD transmission session is the frequency at which transmission packets are sent, the interface processor may update the time threshold (discussed in the description in Step 604) and continue to perform the method of FIG. 6 using the newly specified frequency as the time threshold for Step 604.

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method performed by a network device for offloading bidirectional forwarding detection (BFD) processes from an operating system of the network device to a physical communication interface on the network device, comprising:
   receiving, by a user space packet manager executing in the operating system, a BFD transmission session request, wherein the BFD transmission session request is associated with the physical communication interface;
   making a first determination that utilization of an interface processor, of the physical communication interface, is below a threshold;
   generating, based on the first determination, a transmission packet template, wherein the generation is performed by the user space packet manager;
   sending, by the user space packet manager, the transmission packet template to the physical communication interface; and
   initiating, after the sending, a BFD transmission session in the physical communication interface, wherein the initiating is performed by the user space packet manager.

2. The method of claim 1, wherein the method further comprises:
   receiving a second BFD transmission session request, wherein the second BFD transmission session request is associated with the physical communication interface;
   making a second determination that the utilization of the interface processor exceeds the threshold;
   generating, based on the second determination, a second transmission packet template;
   sending the transmission packet template to a kernel packet manager; and
   initiating a second BFD transmission session via the kernel packet manager.

3. The method of claim 1, wherein in response to sending the transmission packet template to the physical communication interface, the interface processor executes the BFD transmission session, comprising:
   storing the transmission packet template in interface cache;
   copying the transmission packet template to an interface buffer to obtain a transmission packet; and
   sending the transmission packet from the network device to an external network device.

4. The method of claim 3, wherein the BFD transmission session further comprises:
   after copying the transmission packet template to the interface buffer:
      making a second determination that a time threshold is surpassed, wherein sending the transmission packet is based on the second determination.

5. The method of claim 4, wherein the BFD transmission session further comprises:
- receiving an updated time threshold;
- copying the transmission packet template to the interface buffer to obtain a second transmission packet;
- making a third determination that the updated time threshold is surpassed; and
- sending, based on the third determination, the second transmission packet to the external network device.

6. The method of claim 3, wherein the BFD transmission session further comprises:
- receiving a new transmission packet template, wherein based on receiving the new transmission packet template, the interface processor executes:
  - storing the new transmission packet template in the interface cache;
  - copying the new transmission packet template to the interface buffer to obtain a second transmission packet; and
  - sending the second transmission packet to the external network device.

7. The method of claim 1, wherein generating the transmission packet template comprises:
- storing the transmission packet template in a system buffer associated with communication interface.

8. The method of claim 7, wherein the user space packet manager stores the transmission packet template in the system buffer by directly writing to system memory of the network device.

9. A network device, comprising:
- a communication interface, comprising:
  - an interface processor;
  - interface cache; and
  - an interface buffer;
- system memory; and
- a system processor executing a user space packet manager, wherein the user space packet manager performs a method for offloading bidirectional forwarding detection (BFD) processes to the communication interface, comprising:
  - receiving a BFD transmission session request, wherein the BFD transmission session request is associated with the communication interface;
  - making a first determination that utilization of the interface processor, of the communication interface, is below a threshold;
  - generating, based on the first determination, a transmission packet template;
  - sending the transmission packet template to the communication interface; and
  - initiating a BFD transmission session in the communication interface.

10. The network device of claim 9, wherein the method further comprises:
- receiving a second BFD transmission session request, wherein the second BFD transmission session request is associated with the communication interface;
- making a second determination that the utilization of the interface processor exceeds the threshold;
- generating, based on the second determination, a second transmission packet template;
- sending the transmission packet template to a kernel packet manager; and
- initiating a second BFD transmission session via the kernel packet manager.

11. The network device of claim 9, wherein in response to sending the transmission packet template to the communication interface, the interface processor executes the BFD transmission session, comprising:
- storing the transmission packet template in the interface cache;
- copying the transmission packet template to the interface buffer to obtain a transmission packet; and
- sending the transmission packet to an external network device.

12. The network device of claim 11, wherein the BFD transmission session further comprises:
- after copying the transmission packet template to the interface buffer:
  - making a second determination that a time threshold is surpassed, wherein sending the transmission packet is based on the second determination.

13. The network device of claim 12, wherein the BFD transmission session further comprises:
- receiving an updated time threshold;
- copying the transmission packet template to the interface buffer to obtain a second transmission packet;
- making a third determination that the updated time threshold is surpassed; and
- sending, based on the third determination, the second transmission packet to the external network device.

14. The network device of claim 12, wherein the BFD transmission session further comprises:
- receiving a new transmission packet template, wherein based on receiving the new transmission packet template, the interface processor executes:
  - storing the new transmission packet template in the interface cache;
  - copying the new transmission packet template to the interface buffer to obtain a second transmission packet; and
  - sending the second transmission packet to the external network device.

15. The network device of claim 9, wherein generating the transmission packet template comprises:
- storing the transmission packet template in a system buffer associated with communication interface.

16. The network device of claim 15, wherein the user space packet manager stores the transmission packet template in the system buffer by directly writing to the system memory without interacting with an operating system of the network device.

17. A method for offloading bidirectional forwarding detection (BFD) processes to a communication interface, comprising:
- receiving, by a user space packet manager, a BFD transmission session request, wherein the BFD transmission session request is associated with the communication interface;
- making a first determination that utilization of an interface processor, of the communication interface, is below a threshold;
- generating, based on the first determination, a transmission packet template, wherein generating the transmission packet template comprises:
  - storing the transmission packet template in a system buffer associated with communication interface by directly writing to system memory;
- sending the transmission packet template to the communication interface; and
- initiating a BFD transmission session in the communication interface.

18. The method of claim 17, wherein the method further comprises:
- receiving a second BFD transmission session request, wherein the second BFD transmission session request is associated with the communication interface;
- making a second determination that the utilization of the interface processor exceeds the threshold;
- generating, based on the second determination, a second transmission packet template;
- sending the transmission packet template to a kernel packet manager; and
- initiating a second BFD transmission session via the kernel packet manager.

19. The method of claim 17, wherein in response to sending the transmission packet template to the communication interface, the interface processor executes the BFD transmission session, comprising:
- storing the transmission packet template in interface cache;
- copying the transmission packet template to an interface buffer to obtain a transmission packet; and
- sending the transmission packet to an external network device.

20. The method of claim 19, wherein the BFD transmission session further comprises:
- receiving a new transmission packet template, wherein based on receiving the new transmission packet template, the interface processor executes:
  - storing the new transmission packet template in the interface cache;
  - copying the new transmission packet template to the interface buffer to obtain a second transmission packet; and
- sending the second transmission packet to the external network device.

* * * * *